United States Patent
Nagai

(10) Patent No.: US 8,902,446 B2
(45) Date of Patent: Dec. 2, 2014

(54) PRINTING SYSTEM AND INFORMATION PROCESSING APPARATUS

(75) Inventor: Shohei Nagai, Aichi-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 453 days.

(21) Appl. No.: 13/232,364

(22) Filed: Sep. 14, 2011

(65) Prior Publication Data

US 2012/0069381 A1    Mar. 22, 2012

(30) Foreign Application Priority Data

Sep. 20, 2010  (JP) .................................. 2010-210295

(51) Int. Cl.
  *G06F 3/12*  (2006.01)
(52) U.S. Cl.
  CPC .............. *G06F 3/122* (2013.01); *G06F 3/1267* (2013.01); *G06F 3/1291* (2013.01); *G06F 3/1222* (2013.01); *G06F 3/1285* (2013.01)
  USPC ........... 358/1.14; 358/1.13; 358/1.9; 358/1.6; 726/5
(58) Field of Classification Search
  None
  See application file for complete search history.

(56) References Cited

U.S. PATENT DOCUMENTS

| | | | | |
|---|---|---|---|---|
| 6,567,176 | B1* | 5/2003 | Jeyachandran et al. ...... | 358/1.14 |
| 6,707,566 | B1* | 3/2004 | Endoh .......................... | 358/1.15 |
| 6,872,015 | B2* | 3/2005 | Roosen et al. ................. | 400/61 |
| 7,224,476 | B2* | 5/2007 | Yoshida ....................... | 358/1.14 |
| 7,292,355 | B2* | 11/2007 | Jacobsen ...................... | 358/1.13 |
| 8,127,343 | B2* | 2/2012 | Asai .............................. | 726/5 |
| 2004/0032614 | A1* | 2/2004 | Tanaka et al. ................ | 358/1.15 |
| 2007/0273922 | A1* | 11/2007 | Matsugashita ............... | 358/1.15 |
| 2014/0022573 | A1* | 1/2014 | Schleede ...................... | 358/1.13 |

FOREIGN PATENT DOCUMENTS

| | | |
|---|---|---|
| JP | 2003-131842 | 5/2003 |
| JP | 2004-094294 | 3/2004 |
| JP | 2008-040823 | 2/2008 |

* cited by examiner

*Primary Examiner* — Ashish K Thomas
(74) *Attorney, Agent, or Firm* — Scully, Scott, Murphy & Presser, PC

(57) ABSTRACT

A printing system, in which a printing job based on a same printing target is registered in each of a plurality of printers and one of the plurality of printers performs printing in response to a print instruction of the printing job thereto, the printing system including; a determination unit that determines, when registering the printing job in each of the plurality of printers, a registration destination of the printing job for each of the plurality of printers such that both a printer having the printing job registered in a volatile memory and a printer having the printing job registered in a non-volatile memory exist.

15 Claims, 8 Drawing Sheets

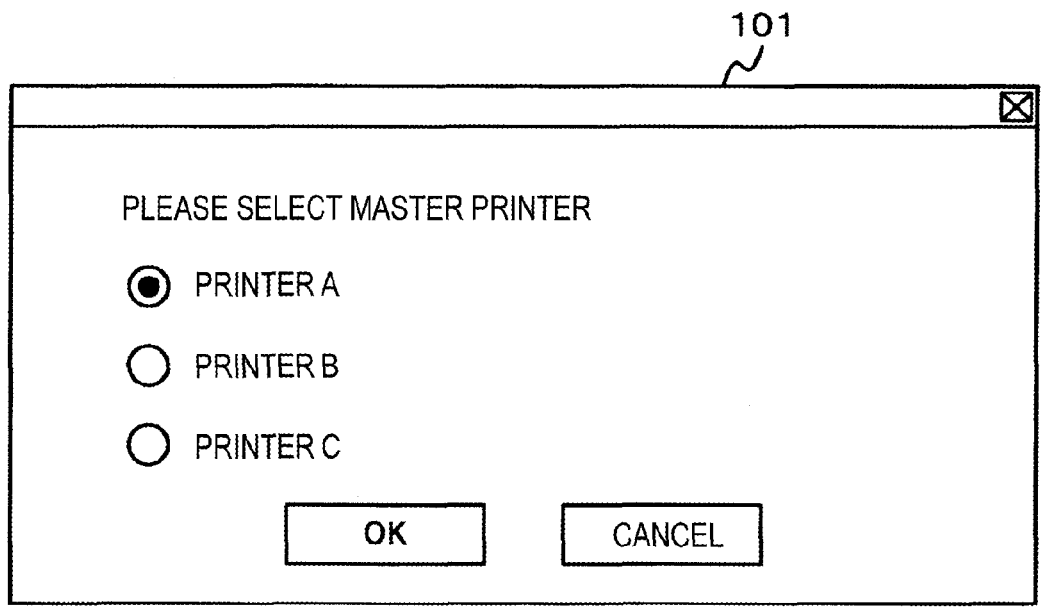

PRINTING SYSTEM AND INFORMATION PROCESSING APPARATUS

CROSS-REFERENCE TO RELATED APPLICATIONS

This application claims priority from Japanese Patent Application No. 2010-210295 filed on Sep. 20, 2010, the entire contents of which are incorporated herein by reference.

TECHNICAL FIELD

Aspects of the invention relate to a printing system and an information processing apparatus. More specifically, aspects of the invention relate to a printing system and an information processing apparatus, in which a printing job based on a same printing target is registered in each of a plurality of printers and printing is started in response to a printing instruction of the printing job.

BACKGROUND

A technology of registering a common printing job in a plurality of printers and executing a printing of the printing job by one of the plurality of printers is well known. For example, related-art discloses a technology of registering a same secure job in each of a plurality of printers and starting printing of the secure job after authentication is performed by one of the plurality of printers.

However, the related-art printing system has the following problems. When the printing job is registered in volatile memories of the respective printers, data is lost when the printer is turned off. Accordingly, it is preferable to register the printing job in non-volatile memories of the respective printers so as to improve certainty of the printing. However, the non-volatile memory is more expensive than the volatile memory with respect to cost per unit data amount. Thus, it is not preferable to simply use the non-volatile memory. That is, a tradeoff problem in that, when all printers use the volatile memory, the certainty of the printing is deteriorated, and when many printers use the non-volatile memory, the efficiency in the use of the memory is lowered, is caused.

SUMMARY

Accordingly, aspects of the invention provide a printing system and an information processing apparatus capable of securing certainty of printing while suppressing the use of a non-volatile memory.

According to an aspect of the invention, there is provided a printing system, in which a printing job based on a same printing target is registered in each of a plurality of printers and each of the plurality of printers performs printing in response to a print instruction of the printing job, the printing system including; a determination unit that determines, when registering the printing job to each of the plurality of printers, a registration destination of the printing job for each of the plurality of printers, such that both a printer having the printing job registered in a volatile memory and a printer having the printing job registered in a non-volatile memory exist.

According to another aspect of the invention, there is provided an information processing apparatus including: a registration unit that registers a printing job based on a same printing target in a plurality of printers; and a determination unit that determines, when the registration unit registers the printing job to each of the plurality of printers, a registration destination of the printing job for each of the plurality of printers, such that both a printer having the printing job registered in a volatile memory and a printer having the printing job registered in a non-volatile memory exist.

According to another aspect of the invention, there is provided a printing system including: a plurality of printers, each of which performing printing in response to a print instruction of a printing job, and an information processing apparatus including, a determination unit that determines a registration destination of a printing job based on a same printing target for each of the plurality of printers, such that both a printer having the printing job registered in a volatile memory and a printer having the printing job registered in a non-volatile memory exist, and a registration unit that registers the printing job in each of the plurality of printers based on the determination by the determination unit.

BRIEF DESCRIPTION OF DRAWINGS

FIG. 5 shows a configuration of a selection screen for selecting a master printer;

FIG. 6 shows a configuration of a database that stores therein execution history of a secure job;

DETAILED DESCRIPTION

Hereinafter, an exemplary embodiment of a printing system of the invention will be described with reference to the drawings. In the exemplary embodiment, the invention is applied to a printing system having a plurality of printers and a personal computer (PC) that registers a secure job in the plurality of printers.

[Overall Configuration of Printing System]

Figure 1:
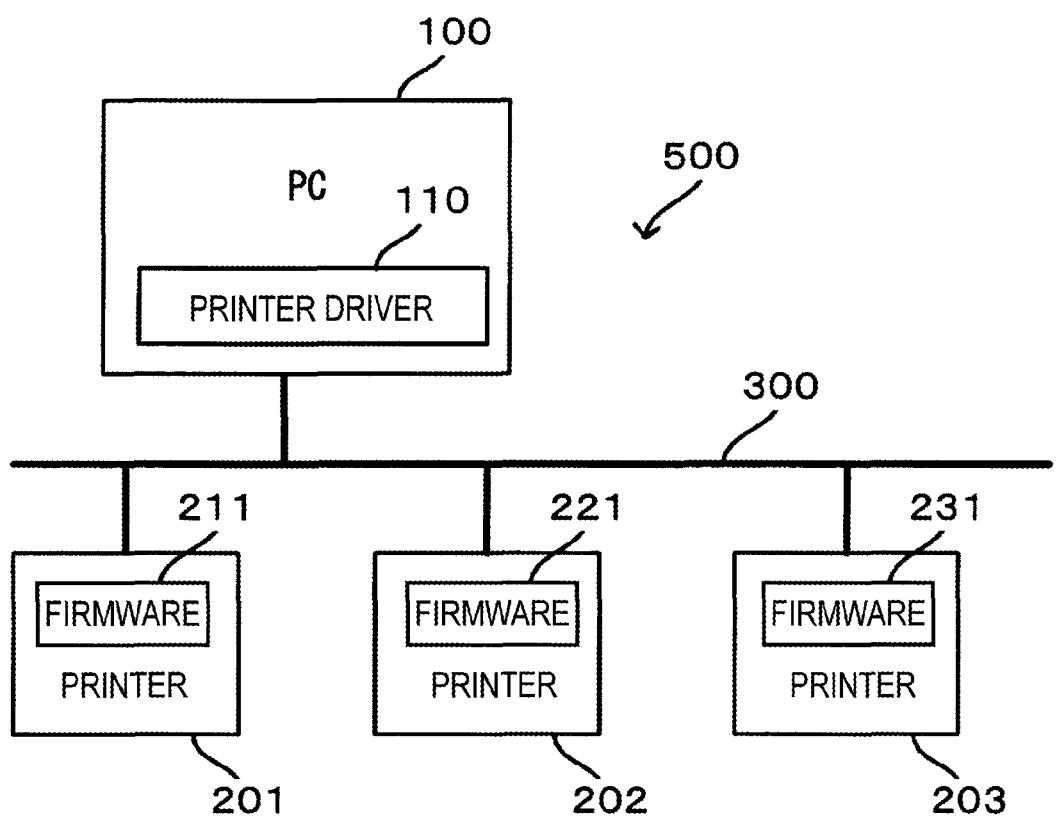
FIG. 1 is a block diagram showing a configuration of a printing system according to an exemplary embodiment.

A printing system 500 of this exemplary embodiment includes, as shown in FIG. 1, a PC 100 (which is an example of an information processing apparatus) that outputs printing data to printers and a plurality of printers 201, 202, 203 each having a secure printing function. The models (device types) of the respective printers 201, 202, 203 are not necessarily the same and may be different from each other. In the printing system 500, the PC 100 and the printers 201, 202, 203 are connected via a network 300 such as Ethernet (registered trademark).

A printer driver 110 that outputs a printing job corresponding to the printers 201, 202, 203 is installed in the PC 100. The printer driver 110 of this exemplary embodiment is a universal driver that is compatible to a plurality of device types and creates printing jobs that match with specifications of the respective printers 201, 202, 203. Meanwhile, the printer driver that is installed in the PC 100 is not limited to the universal printer driver. For example, printer drivers compatible with the respective printers may be respectively installed.

In the printer 201, firmware 211 that controls an image forming unit, an operation unit and the like, is installed. Also in the other printers 202, 203, firmware 221, 231 corresponding to the respective device types are installed.

Number of printers and PCs configuring the printing system 500 are not limited. In addition, other information processing apparatuses or image processing apparatuses may be connected to the printing system 500.

[Configuration of PC]

Figure 2:
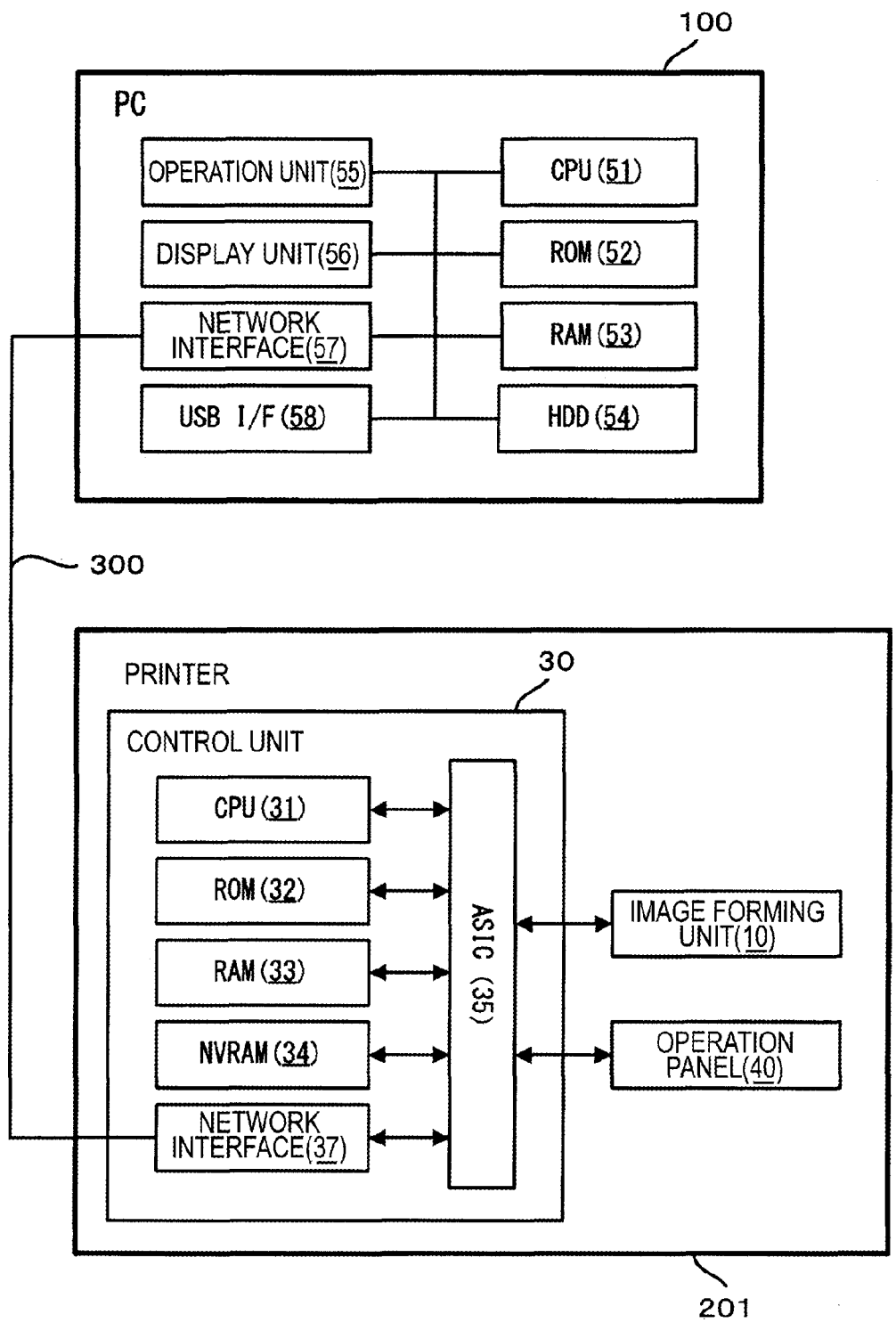
FIG. 2 is a block diagram showing an electric configuration of a PC and a printer that are included in the printing system.

Hereinafter, a configuration of the PC 100 is schematically described. As shown in FIG. 2, the PC 100 has a central processing unit (CPU) 51, a read-only memory (ROM) 52, a random access memory (RAM) 53, a hard disc drive (HDD) 54, an operation unit 55 including a keyboard, a mouse and the like, a display unit 56 including a liquid crystal display and the like, a network interface 57 and a universal serial bus (USB) interface 58.

In the HDD 54 of the PC 100, an operating system (OS), device drivers for controlling various devices, application programs having a printing instruction function, such as word processor, spreadsheet software and the like, are installed. The printer driver 110 is also installed in the HDD 54.

According to a control program read out from the ROM 52 or an application program read out from the HDD 54, the CPU 51 performs a variety of processes while storing calculation results thereof in the RAM 53 or HDD 54. The operation of the printer driver 110 is also processed by the CPU 51.

The network interface 57 or USB interface 58 are interfaces enabling communication with an external apparatus. In this exemplary embodiment, the PC sends and receives data to and from the printer 201, and the like, via the network interface 57.

[Configuration of Printer]

Hereinafter, a configuration of the printer 201 is schematically described. As shown in FIG. 2, the printer 201 has a control unit 30, which has a central processing unit (CPU) 31, a read-only memory (ROM) 32, a random access memory (RAM, an example of a volatile memory) 33, an non-volatile read only memory (NVRAM, an example of a non-volatile memory) 34, an application specific integrated circuits (ASIC) 35 and a network interface 37. In addition, the control unit 30 is electrically connected to an image forming unit 10 that forms an image on a sheet and an operation panel 40 that displays an operation status and receives a user's input operation. Meanwhile, since the printers 202, 203 both have the same configuration, the descriptions thereof will be omitted.

The ROM 32 stores therein the firmware 211 that is a control program for controlling the printer 201, a variety of settings, initial values and the like. The RAM 33 is a work area from which the various control programs are read out and is also used as a storage area that temporarily stores image data.

In response to the control program read out from the ROM 32 or signals sent from a variety of sensors, the CPU 31 stores processing results thereof in the RAM 33 or NVRAM 34 and controls the respective constitutional elements of the printer 201 through the ASIC 35. The operation of the firmware 211 is also processed by the CPU 31.

The network interface 37 is an interface enabling communication with an external apparatus. In this illustrative embodiment, the printer sends and receives data to and from the PC and the like via the network interface 37.

[Outline of Secure Printing]

Hereinafter, the secure printing of the printing system 500 is described. In the printing system 500 of this exemplary embodiment, a secure job that is a printing job to which a password is set is sent to the plurality of printers. The respective printers having received the secure job register the secure job in the memories thereof and then go into a printing standby state. After that, password authentication is performed at one of the plurality of printers, and then, printing is performed with respect to the secure job. Hereinafter, the printing of the secure job is referred to as secure printing.

Figure 3:
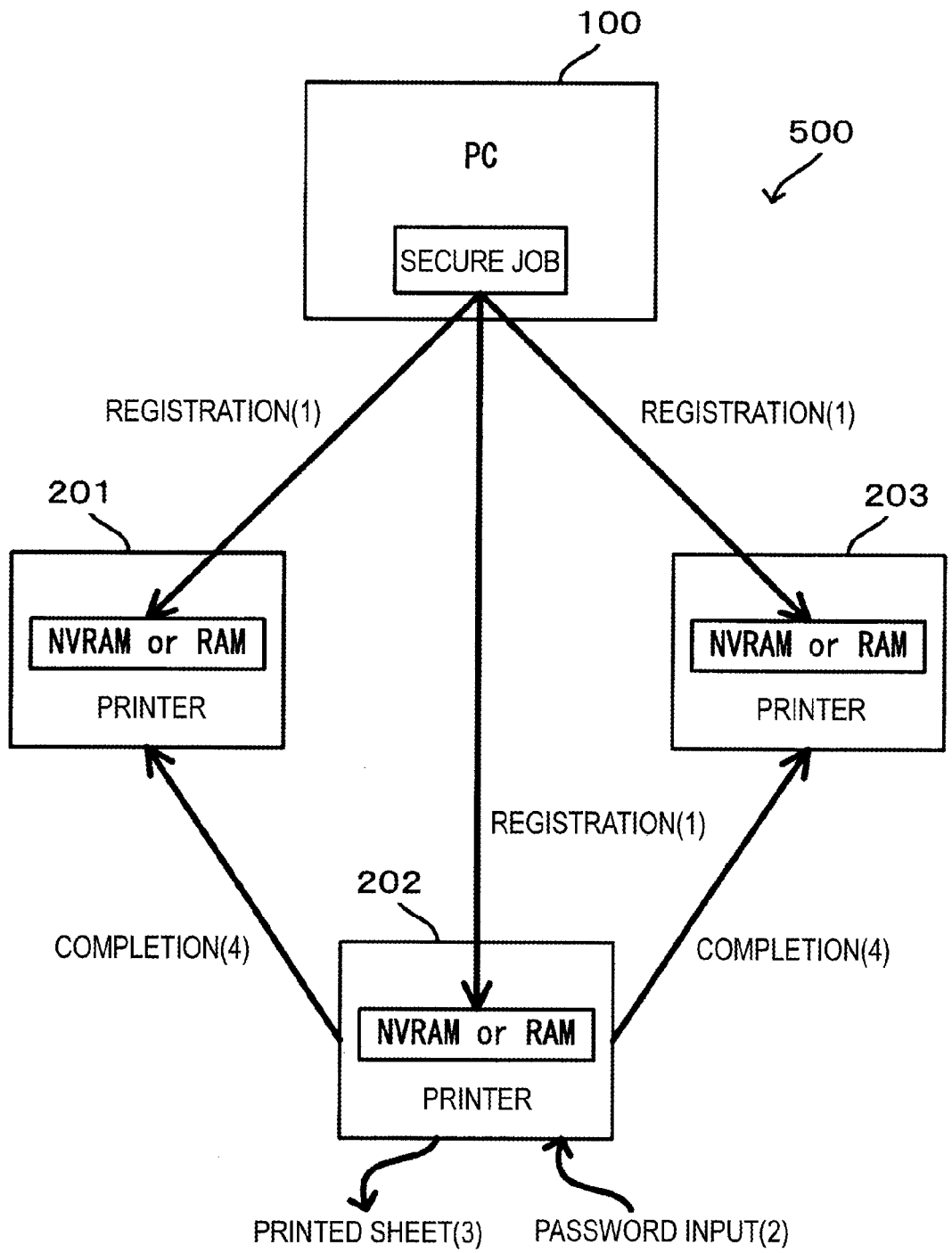
FIG. 3 is a block diagram showing secure printing.

Specifically, as shown in FIG. 3, in the printing system 500, a secure job that is generated in the PC 100 is sent to the plurality of printers 201, 202, 203 and is registered in the NVRAM 34 or RAM 33 of each printer (1).

A user inputs a password through the operation panel 40 in one of the plurality of printers 201, 202, 203 (printer 202 in FIG. 3) having received the secure job (2). The printer into which the password is input compares the input password with a password that is set to the secure job. When both passwords are consistent, the printer starts printing the secure job corresponding to the password (3). After the printing is completed, a completion notification is output from the printer in which the printing has been completed to the other of the plurality of printers. Then, the printers having received the completion notification delete the job that is the same job as the secure job for which the printing has been completed (4).

The secure printing does not start until the user inputs the appropriate password. Accordingly, there is no concern that a third party sees the printed sheet or takes it, so that secrecy is high. In addition, since the secrecy is high, the printing of a confidential document is assumed, and therefore, a request for certainty of printing is also high.

[Operations of Secure Printing]

Hereinafter, a sequence of operations of the PC 100 and that of operations of the one of plurality printers 201, 202, 203 during the above-described secure printing will be described separately. In the following descriptions, the operation of the printer 201 will be described as an operation of the printer. However, the same operation is also performed in the printers 202, 203.

[Job Sending Process (PC)]

Figure 4:
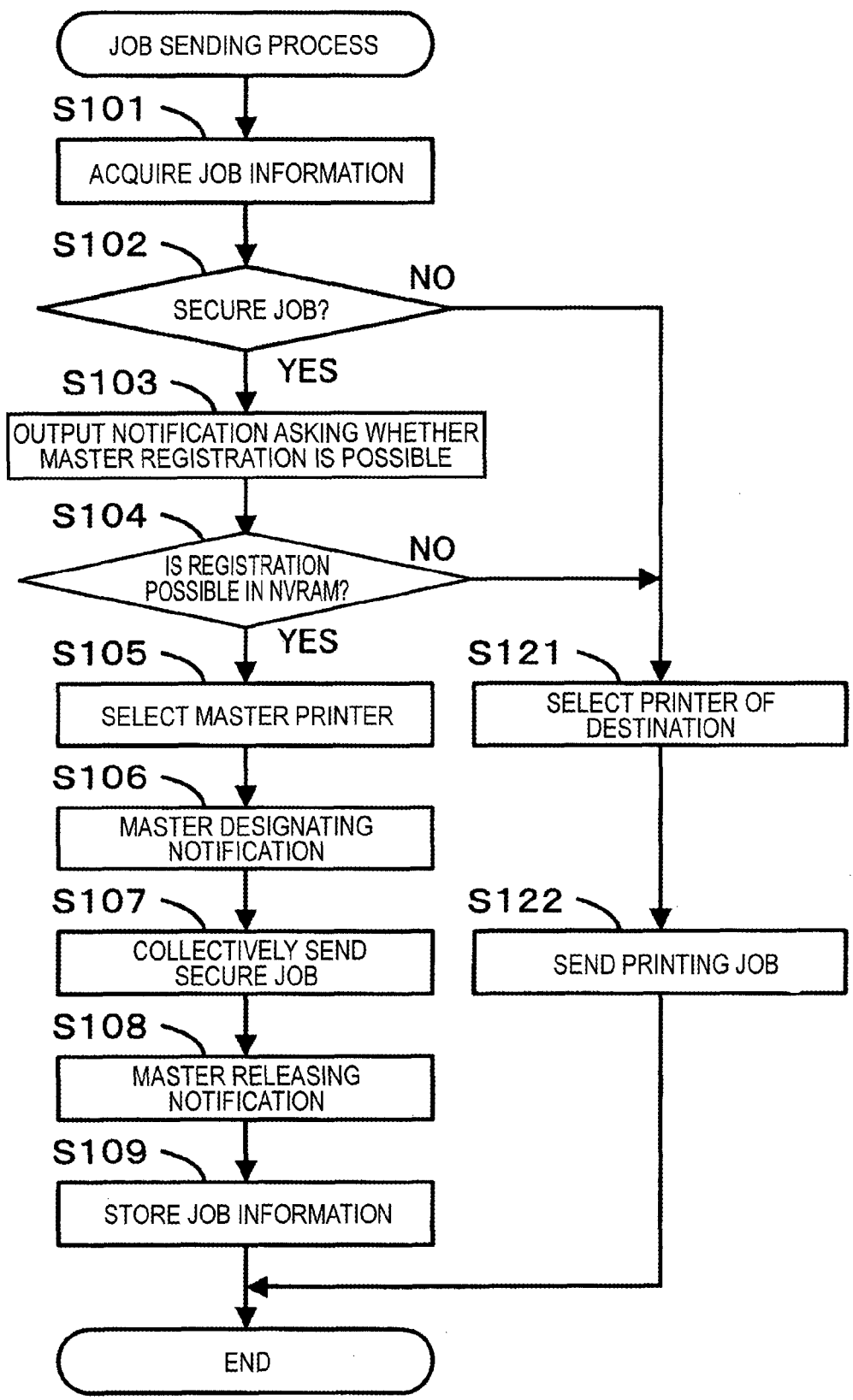
FIG. 4 is a flow chart showing a sequence of a job sending process by the PC.

First, a job sending process (an example of a registration unit and a determination unit) that is executed by the printer driver 110 of the PC 100 is described with reference to a flow chart of FIG. 4. The job sending process is executed when the printer driver 110 receives a printing instruction through the application program, and the like.

First, the printer driver acquires job information of a printing job (S101). In S101, the printer driver acquires information indicating whether the printing job is a secure job or not. Based on the job information acquired in S101, the printer driver determines whether the printing job for which printing is instructed is a secure job (S102).

When the printing job is not a secure job (S102: NO), the printer driver displays a screen for selecting a printer, which is a destination of the printing job, and receives selection of a printer (S121). Then, the printer driver sends the printing job to the selected printer (S122) and ends the job sending process. On the other hand, when information about the destination of the printing job is included in the job information acquired in S101, the printer driver proceeds to S122 without executing S121 and sends the printing job.

When the printing job is a secure job (S102: YES), the printer driver outputs a notification, which asks whether master registration is possible, to all printers that are registration targets of the secure job (the plurality of printers 201, 202, 203, in this exemplary embodiment) (S103). In the secure printing of this exemplary embodiment, the printer driver determines one master printer from the plurality of printers that are registration targets of the secure job. Then, the printer driver registers the secure job in the NVRAM 34 of the master printer and in the RAM 33 of the other of the plurality of printers. Thus, as a preparation for determining a master printer, the printer driver asks each of the plurality of printers whether it can be a master printer.

Each of the plurality of printers having received the notification that is output in S103 acquires an available space of the NVRAM 34 thereof and outputs a notification, which indicates that the master registration is possible, to the PC 100 when the available space is equal to or larger than a threshold value C. When the available space is below the threshold value C, the printer outputs a notification, which indicates that the master registration is not possible, to the PC 100. A data size of the secure job may be added to the notification, which is output from the PC 100 and asks whether the master registration is possible. In this case, the printer may compare the data size with the available space of the NVRAM 34. After outputting the notification asking whether the master registration is possible, the PC 100 waits for responses from the plurality of printers, i.e., a notification indicating that the master registration is possible or a notification indicating that the master registration is not possible, which is output from each printer.

After receiving the responses from each of the plurality of printers, the printer driver determines whether a notification indicating that the master registration is possible is received from at least one printer, i.e., whether at least one printer can register the secure job in the NVRAM 34 (S104). When no notification indicating that the master registration is possible is received (S104: NO), the printer driver proceeds to S121 and enables the user to select a printer as a destination of the secure job and then sends the secure job to the selected printer. In S121, the selection is made from the plurality of printers having received the notification which asks whether master registration is possible.

When a notification indicating that the master registration is possible is received (S104: YES), the printer driver selects a master printer from the printers having output the notification indicating that the master registration is possible (S105). In this exemplary embodiment, a selection screen 101 shown in FIG. 5 is displayed which enables the user to select a master printer. In the selection screen 101, the printers (hereinafter, referred to as 'master candidate printers'), having output the notification indicating that the master registration is possible, are listed, so that one of them can be selected. When an OK button is pushed with one printer being selected, the selected printer is determined as the master printer.

Meanwhile, with respect to the selection of the master printer in S105, the PC 100 may automatically determine a master printer, instead of the user selecting it. For example, the printer driver may acquire using frequencies of the respective master candidate printers by the user, and may determine, as a master printer, a master candidate printer having the highest using frequency. The using frequency of a printer may be obtained by the using number of times of the printer per unit time or the latest using date and time of the printer. By determining a master candidate printer having the highest using frequency, as a master printer, a possibility that a printing instruction will be first input to the master printer becomes high. As a result, a possibility that, the printer, to which the printing instruction is first input will positively print the secure job, becomes also high.

In addition, the printer driver may ask the respective master candidate printers for the available spaces of the NVRAM 34 and determine, as a master printer, a master candidate printer having the largest available space. By determining, as a master printer, the printer having the largest available space in the non-volatile memory, a possibility that the secure job will be securely registered becomes high.

Further, distances to the respective master candidate printers may be calculated and a master candidate printer having the shortest distance to the PC 100 may be then determined as a master printer. The shorter the distance to the PC 100, the higher a possibility that a printing instruction will be input. Accordingly, by determining, as a master printer, the closest master candidate printer, the printing possibility may be increased. In the meantime, the distance to the PC 100 may be calculated by using a position measuring system such as GPS. In addition, based on IP addresses, a printer having a closest number may be assumed as the printer having the shortest distance to the PC. Additionally, the distances to the PC 100 may be stored in the respective printers in advance.

After selecting the master printer in S105, the printer driver outputs a master designating notification to the selected master printer (S106). The printer having received the master designating notification switches a master printer flag from OFF to ON. The master printer flag is information that is stored in each printer and has an initial value of OFF.

Then, the printer driver collectively sends the secure job to each of the plurality of printers that become registration targets of the secure job (S107). The secure job includes printing data of a PDL format, which is generated according to the specifications of the respective printers, and a password. In SI07, the secure job is sent to each of the plurality of printers that becomes registration targets of the secure job, without distinguishing whether each printer is a master printer. The received secure job is registered in each of the plurality of printers in either one of the NVRAM 34 and the RAM 33 in accordance with the state of the master printer flag. Each of the plurality of printers stands by without starting printing until a printing instruction is received.

After S107, the printer driver outputs a master releasing notification to the master printer (S108). The master printer having received the master releasing notification switches the master printer flag from ON to OFF.

After S108, the printer driver stores the information of the secure job (S109). The PC 100 has a database 105 shown in FIG. 6 in the HDD 54. The database 105 stores, as a single record, a job identifier (job ID), a master printer, a user name and date and time of registration, which are information of the secure job. The information of the database 105 is displayed by a utility program that the printer driver 110 has and the user can check the history of the secure job through the utility program. The database 105 stores the information of the master printer. Therefore, the user can know the master printer through the utility program even when the user forgets which printer was the mater printer. After S109, the printer driver ends the job sending process.

In S109, the information of the secure job is stored and the content thereof can be checked through the utility program. However, the notifying means of the information of the secure job is not limited thereto. For example, after collectively sending the secure job, the information of the secure job may be displayed on the display unit 56 of the PC 100.

[Job Receiving Process (Printer)]

Figure 7:
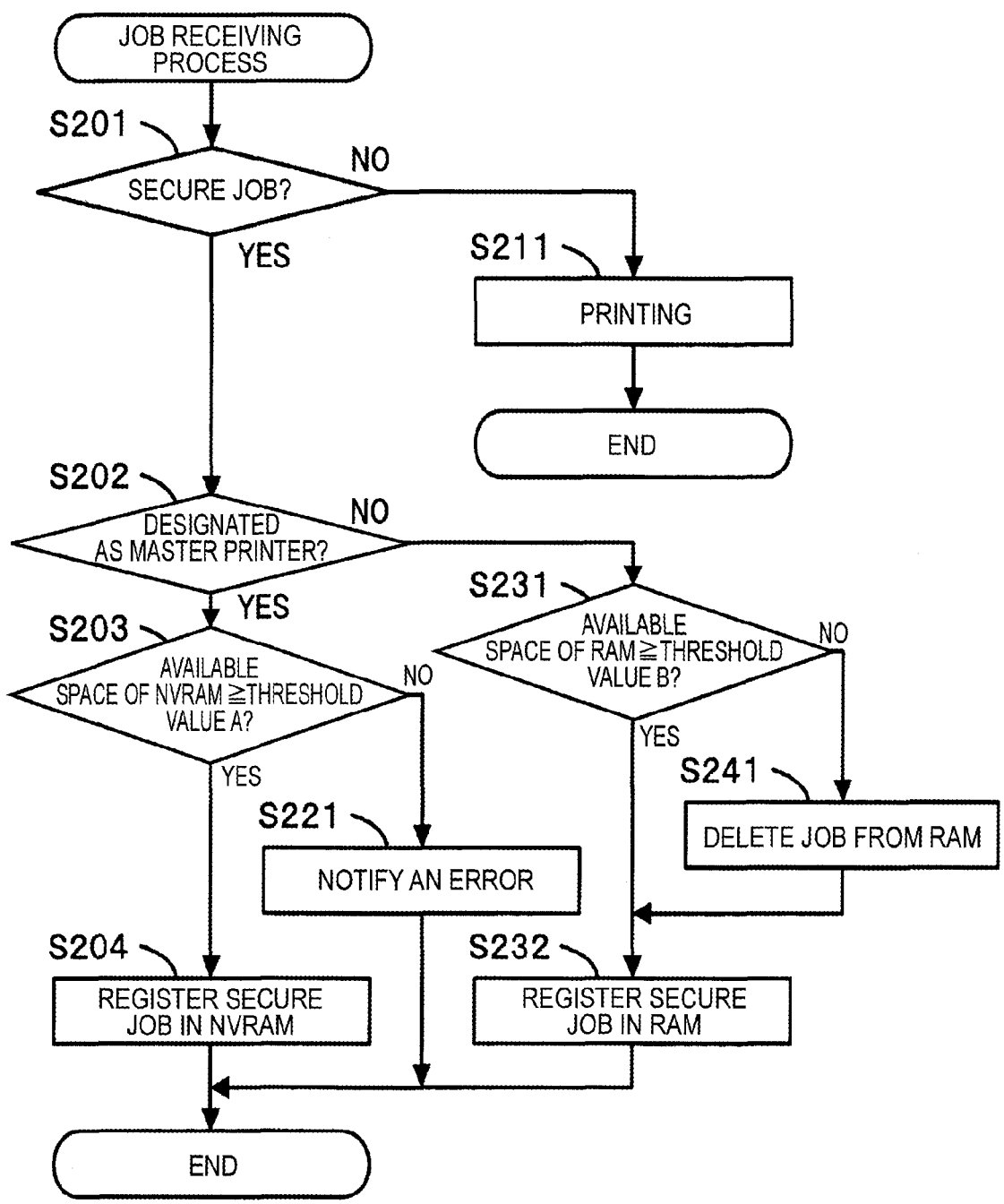
FIG. 7 is a flow chart showing a sequence of a job receiving process by the printer.

Hereinafter, a job receiving process that is executed by the firmware 211 of the printer 201 is described with reference to a flow chart of FIG. 7. The job receiving process is executed when the printing job sent from the PC 100 is received.

First, the firmware determines whether the received printing job is a secure job (S201). When the received printing job is not a secure job (S201: NO), the printer starts printing the received printing job (S211) and ends the job receiving process.

When the received printing job is a secure job (S201: YES), the firmware determines whether the corresponding printer is designated as a master printer (S202). Specifically, when the master printer flag is ON, the firmware determines that the corresponding printer is designated as a master printer. When the master printer flag is OFF, the firmware determines that the corresponding printer is not designated as a master printer. The master printer flag becomes ON when the master designating notification is received from the PC 100 (refer to S106 of FIG. 4).

When the corresponding printer is designated as a master printer (S202: YES), the firmware determines whether the available space of the NVRAM 34 is equal to or larger than a threshold value A (S203). When the available space of the NVRAM 34 is equal to or larger than a threshold value A (S203: YES), the firmware registers the received secure job in the NVRAM 34 (S204). Then, the firmware ends the job receiving process. On the other hand, when the available space of the NVRAM 34 is smaller than a threshold value A (S203: NO), the firmware notifies an error to the operation panel 40 of the printer 201 (S221). Specifically, the firmware displays a message indicating that the secure job cannot be registered in the NVRAM 34. After S221, the firmware ends the job receiving process without registering the secure job.

When the corresponding printer is not designated as a master printer (S202: NO), the firmware determines whether the available space of the RAM 33 is equal to or larger than a threshold value B (S231). When the available space of the RAM 33 is equal to or larger than a threshold value B (S231: YES), the firmware registers the received secure job in the RAM 33 (S232). Then, the firmware ends the job receiving process. When the available space of the RAM 33 is smaller than a threshold value B (S231: NO), the firmware deletes, among the secure jobs registered in the RAM 33, the secure job having the oldest date and time of registration from the RAM 33 (S241). After S241, the firmware registers the secure job in the RAM 33 (S232) and ends the job receiving process.

As described above, in the job receiving process, when the printer 201 is a master printer, the firmware registers the secure job in the NVRAM 34. When the printer 201 is not a master printer, the firmware registers the secure job in the RAM 33. Among all the printers that become registration targets of the secure job, there is only one master printer. In the printing system 500, there is one printer that registers the secure job in the NVRAM 34 and the other printers register the secure job in each RAM 33. In other words, both the printer that registers the printing job in the NVRAM 34 (non-volatile memory) and the printer that registers the printing job in the RAM 33 (volatile memory) exist.

Furthermore, when the available space of the RAM 33 is insufficient, the secure job registered in the RAM 33 is first erased. In other words, even when the other printer is a master printer and the secure job registered in the RAM 33 is erased, a possibility that, the entire printing system 500 will not be able to print the secure job, is low. Therefore, the other printers except for the master printer secure the available spaces of the RAM 33 by erasing the secure job not printed, thereby preferentially registering the latest secure job.

In the meantime, when a printer is a master printer but the available space of the NVRAM 34 thereof is insufficient, the secure job registered in the NVRAM 34 is not first erased. In other words, if the secure job registered in the NVRAM 34 is erased, a possibility that, the entire printing system 500 will not be able to print the secure job to be erased, becomes high. Accordingly, even when the available space of the NVRAM 34 is small, the secure job registered in the NVRAM 34 is not erased until the printing of the secure job is completed.

[Secure Printing Process (Printer)]

Figure 8:
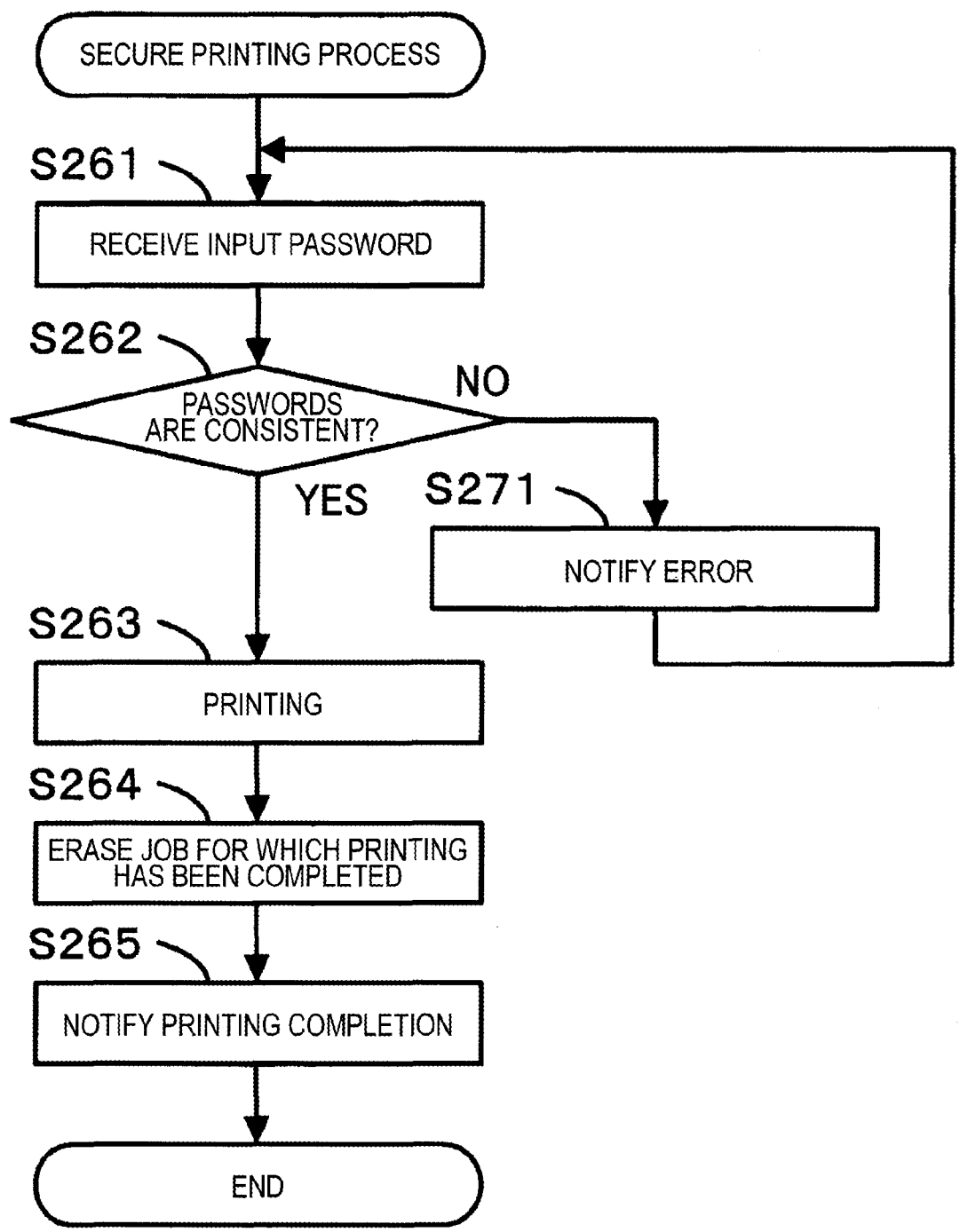
FIG. 8 is a flow chart showing a sequence of a secure printing process by the printer.

In the followings, a secure printing process that is executed by the firmware 211 of the printer 201 is described with reference to FIG. 8. When printing the secure job, the printer 201 displays a list of the registered secure jobs on the operation panel and receives selection of a secure job of a printing target. In addition, the printer receives a printing instruction of the selected secure job. The secure printing process is executed when the printing instruction of the secure job by the user's operation is received.

First, the firmware displays, on the operation panel 40 of the printer 201, a message urging the user to input a password, and receives an input of the password (S261). Then, the firmware compares the input password with the password of the secure job to determine whether the passwords are consistent with each other (S262). When the passwords are not consistent with each other (S262: NO), the firmware displays an error message on the operation panel 40 (S271). After the error notification, the firmware returns to S261 and urges the user to input a password again.

When the passwords are consistent with each other (S262: YES), the firmware starts to print the secure job (S263). In other words, the firmware reads out the secure job from the NVRAM 34 or RAM 33 and prints an image on a sheet in the image forming unit 10 based on the printing data that is developed from the PDL format in a raster format.

After completing the printing, the firmware erases the secure job for which the printing has been completed from the NVRAM 34 or RAM 33 (S264). In addition, the firmware outputs a notification, which indicates that the printing of the secure job has been completed, to the other printers 202, 203 (S265). After S265, the firmware ends the secure printing process.

The printer having received the printing completion notification of S265 searches the secure job for which the printing has been completed from the NVRAM 34 or RAM 33 thereof. Then, when the secure job is searched, that is, when the secure job is registered, the printer erases the secure job.

As described above, when registering the secure job in the plurality of printers 201, 202, 203 from the PC 100, the printing system 500 of this exemplary embodiment determines the registration destinations so that both the printer registering the printing job in the RAM 33 (volatile memories) and the printer registering the printing job in the NVRAM 34 (non-volatile memory) exist. Thereby, at least one printer using the NVRAM 34 exists in the printing system 500. Accordingly, a situation in which the printing job is registered only in the RAM is prevented, so that it is possible to secure the certainty of the printing. In addition, there is at least one printer that uses the non-volatile memory. Accordingly, compared to a configuration in which all printers use the NVRAM 34, it is possible to suppress the NVRAM 34 from being used in the entire system.

The above exemplary embodiment does not limit the scope of invention. Accordingly, the invention can be variously modified and improved without departing from the gist of the invention. For example, any printer having a printing function may be used as the printer. In addition, a multifunctional apparatus or a copier may also be applied. Further, the information processing apparatus is not limited to the PC. For example, a portable information terminal or work station may also be applied.

In the above-described exemplary embodiment, the invention is applied to the printing system in which the secure job is registered in the plurality of printers. However, the printing job to be registered is not limited to the secure job. In other words, the invention can be applied to any configuration in which a printing job based on a same printing target is registered in a plurality of printers and each of the plurality of printers performs printing in response to a printing instruction of the printing job. For example, the invention can also be applied to a printing job for which the authentication is not required when performing printing.

In the above-described exemplary embodiment, the same printing job is registered in the plurality of printers 201, 202, 203. However, the printing job does not need to be same. In other words, the printing job is only required to be based on the same printing target and the printing job to be registered may be different depending on the specification of the printer (whether the printer can correspond to colors, for example).

In the above-described exemplary embodiment, the PC 100 sends the printing job to all printers configuring the printing system 500. However, it is not necessarily required that the PC should send the printing job to all printers. In other words, it is only required that the PC sends the printing job to a plurality of printers. For example, the invention can also be applied to a configuration in which a plurality of printers is grouped and the PC sends the printing job to a plurality of printers belonging to the group.

Figure 9:
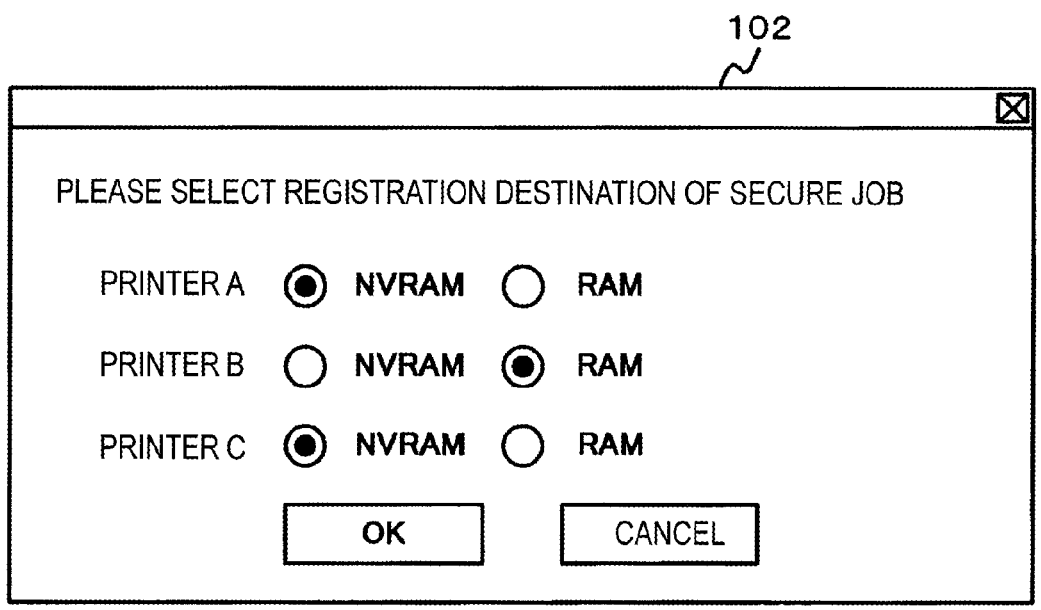
FIG. 9 shows a configuration of a selection screen for selecting a registration destination memory of a secure job.

In the above-described exemplary embodiment, only one master printer is selected. However, a plurality of master printers may exist. If a plurality of master printers exists, the certainty of printing can be further improved. To achieve this configuration, for example, a user may be enabled to select a plurality of printers in the selection screen 101 (refer to FIG. 5) of the master printer in S105. Alternatively, as shown in FIG. 9, a selection screen 102, with which it is possible to select whether to register a printing job in the NVRAM 34 or RAM 33 for each of the printers, may be displayed so that a user can determine a registration destination for each of the printers. In this case, when a user designates the NVRAM 34 or RAM 33 for all the printers, an error may be notified so as to refuse the determination. Meanwhile, when only one master printer is selected, it is possible to suppress the using of the non-volatile memory to the minimum while securing the certainty of printing.

In the above-described exemplary embodiment, each printer has both the volatile memory (RAM) and the non-volatile memory (NVRAM). However, it is not necessarily required that each printer has both the memories. For example, a printer having only a volatile memory and a printer having only a non-volatile memory may be included in the printing system 500. Even in this case, by determining at least one of the printers having a volatile memory and at least one of the printers having a non-volatile memory as the registration destinations of the printing job, both the printer that registers the printing job in the non-volatile memory and the printer that registers the printing job in the volatile memory exist.

In the above-described exemplary embodiment, the master printer is determined before the secure job is sent and the memory of the destination is determined depending on whether a printer is the master printer. However, for example, a configuration may be possible in which the PC adds the memory information of the destination to the secure job and the printers read out the memory information to determine the memories of the destinations.

The present invention provides illustrative, non-limiting aspects as follows:

(1) According to a first aspect, there is provided a printing system, in which a printing job based on a same printing target is registered in each of a plurality of printers and one of the plurality of printers performs printing in response to a print instruction of the printing job thereto, the printing system including: a determination unit that determines, when registering the printing job in each of the plurality of printers, a registration destination of the printing job for each of the plurality of printers such that both a printer having the printing job registered in a volatile memory and a printer having the printing job registered in a non-volatile memory exist.

According to this configuration, in the printing system, a printing job (for example, secure job) based on a same printing target is registered in each of a plurality of printers by an information processing apparatus such as PC, and printing is performed in response to a user inputting a printing instruction to one of the plurality of printers. When registering the printing job in each of the plurality of printers, the printing system determines registration destinations of the printing job such that both a printer having the printing job registered in a volatile memory and a printer having the printing job registered in a non-volatile memory exist. The printing job is registered to each of the plurality of printers in the memories thereof in accordance with the determination by the printing system.

In other words, the printing system sorts the registration destinations so that both a printer having the printing job registered in the volatile memory and a printer having the printing job registered in a non-volatile memory exist. Thereby, at least one printer that uses the non-volatile memory exists in the printing system. Accordingly, a situation in which a printing job is registered only in the volatile memories is prevented, so that it is possible to secure the certainty of the printing. In addition, there is at least one printer that uses a non-volatile memory. Accordingly, compared to a configuration in which all printers use the non-volatile memories, it is possible to suppress the non-volatile memories from being used in the entire system.

In the method of determining the registration destinations by the determination unit, so that both a printer having the printing job registered in the volatile memory and a printer having the printing job registered in a non-volatile memory exist, a user is allowed to select a predetermined number of printers (that is smaller than the total number of printers that are registration targets) such that the non-volatile memory is determined, as a registration destination, for the selected printer, and the volatile memory is determined, as a registration destination, for the unselected printer, for example. It may be also possible that the volatile memory is determined, as a registration destination, for the selected printer, and the non-volatile memory, is determined, as a registration destination, for the unselected printer. In addition to this, the determination unit may randomly select the predetermined number of printers, or alternatively, may automatically select the predetermined number of printers based on a predetermined characteristic (for example, using frequency of a user, a memory available space of a printer and the like).

(2) According to a second aspect, there is provided the printing system according to the first aspect, wherein at least one of the plurality of printers has both the volatile memory and the non-volatile memory, and wherein the determination unit determines whether to register the printing job in the volatile memory or the non-volatile memory of the at least one of the plurality of printers.

(3) According to a third aspect, there is provided the printing system according to the first aspect, wherein each of the plurality of printers has both the volatile memory and the non-volatile memory, and wherein the determination unit determines whether to register the printing job in the volatile memory or the non-volatile memory of each of the plurality of printers.

When a printer has only one of the volatile memory and the non-volatile memory, the registration destination is inevitably determined for the printer. However, by the printer having both the volatile memory and the non-volatile memory, the printing job can be registered in either of the memories. Thus, a degree of freedom of the determination is increased.

(4) According to a fourth aspect, there is provided the printing system according to the first aspect, wherein the printer having the printing job registered in the volatile memory erases a registered printing job from the volatile memory when an available space of the volatile memory is below a threshold value.

Even when the printing job registered in the volatile memory is erased, a possibility that the entire printing system will not be able to print the printing job is low. Accordingly, in a situation in which an available space of the volatile memory is small, it is preferable to secure an available space of the volatile memory by erasing the printing job.

(5) According to a fifth aspect, there is provided the printing system according to the first aspect, wherein the printer having the printing job registered in the non-volatile memory does not erase a registered printing job from the non-volatile memory even when an available space of the non-volatile memory is below a threshold value.

When the printing job registered in the non-volatile memory is erased, a possibility that the entire printing system will not be able to print the printing job is high. Accordingly, even in a situation in which an available space of the non-volatile memory is small, it is preferable not to erase the printing job registered in the non-volatile memory until the printing is performed.

(6) According to a sixth aspect, there is provided the printing system according to the first aspect, wherein the determination unit allows a user to select at least one printer in which the printing job will be registered in the volatile memory or at least one printer in which the printing job will be registered in the non-volatile memory.

For example, at least one of the volatile memories and the non-volatile memories may be respectively selected. In addition, when one non-volatile memory is selected, the other memories may be automatically selected as volatile memories. The user selection is enabled in such a manner, so that it is possible to reflect the user's request.

(7) According to a seventh aspect, there is provided the printing system according to the first aspect, wherein the determination unit determines, as the printer in which the printing job will be registered in the non-volatile memory, a printer having a higher using frequency in priority to a printer having a lower using frequency.

According to this configuration, the registration destinations can be automatically determined, so that the user's inconvenience is decreased. Meanwhile, the printer having a higher using frequency has a higher possibility that it will receive a printing instruction, compared to the printer having a lower using frequency. Accordingly, in the printer having a high using frequency, it is preferable to register the printing job in the non-volatile memory that securely keeps the printing job.

(8) According to an eighth aspect, there is provided the printing system according to the first aspect, wherein the determination unit determines, as the printer in which the printing job will be registered in a non-volatile memory, a printer having a non-volatile memory with a larger available space in priority to a printer having a non-volatile memory with a smaller available space.

According to this configuration, the registration destinations can be automatically determined, so that the user's inconvenience is decreased. Meanwhile, the printer having a larger available space of the non-volatile memory has a higher possibility that the printing job will be securely registered in the non-volatile memory, so that it is possible to increase the certainty of the printing.

(9) According to a ninth aspect, there is provided an information processing apparatus including: a registration unit that registers a printing job based on a same printing target in a plurality of printers; and a determination unit that determines, when the registration unit registers the printing job to each of the plurality of printers, a registration destination of the printing job for each of the plurality of printers such that both a printer having the printing job registered in a volatile memory and a printer having the printing job registered in a non-volatile memory exist.

(10) According to a tenth aspect, there is provided a printing system including: a plurality of printers, one of which performing printing in response to a print instruction of a printing job thereto, and an information processing apparatus including, a determination unit that determines a registration destination of a printing job based on a same printing target for each of the plurality of printers such that both a printer having the printing job registered in a volatile memory and a printer having the printing job registered in a non-volatile memory exist, and a registration unit that registers the printing job in each of the plurality of printers based on the determination by the determination unit.

(11) According to an eleventh aspect, there is provided the printing system according to the tenth aspect, wherein the information processing apparatus further includes, a first receiving unit that receives information relating to the printing job, a sending unit that sends a notification to each of the plurality of printers based on the information received by the first receiving unit, and a second receiving unit that receives a response to the notification sent by the sending unit from each of the plurality of printers, and wherein the determination unit determines the registration destination of the printing job for each of the plurality of printers based on the response received by the second receiving unit.

(12) According to a twelfth aspect, there is provided the printing system according to the eleventh aspect, wherein the information relating to the printing job indicates whether the printing job is a secure job.

(13) According to a thirteenth aspect, there is provided the printing system according to the twelfth aspect, wherein, when the information received by the first receiving unit indicates that the printing job is a secure job, the sending unit sends the notification, and when the information received by the first receiving unit indicates that the printing job is not a secure job, the sending unit does not send the notification.

(14) According to a fourteenth aspect, there is provided the printing system according to the eleventh aspect, wherein the second receiving unit receives a first response or a second response as the response from each of the plurality of printers, and wherein the determination unit determines whether at least one first response has been received from the plurality of printers.

(15) According to a fifteenth aspect, there is provided the printing system according to the fourteenth aspect, wherein, when the determination unit determines that at least one first response has been received, the printer in which the printing job will be registered in the non-volatile memory is determined from a printer from which the first response has been received.

What is claimed is:

1. A printing system, in which a printing job based on a same printing target is registered in each of a plurality of printers and one of the plurality of printers performs printing in response to a print instruction of the printing job thereto, the printing system comprising;
- a determination unit that determines, when registering the printing job in each of the plurality of printers, a registration destination of the printing job for each of the plurality of printers such that both a printer having the printing job registered in a volatile memory and a printer having the printing job registered in a non-volatile memory exist.

2. The printing system according to claim 1,
wherein at least one of the plurality of printers has both the volatile memory and the non-volatile memory, and
wherein the determination unit determines whether to register the printing job in the volatile memory or the non-volatile memory of the at least one of the plurality of printers.

3. The printing system according to claim 1,
wherein each of the plurality of printers has both the volatile memory and the non-volatile memory, and
wherein the determination unit determines whether to register the printing job in the volatile memory or the non-volatile memory of each of the plurality of printers.

4. The printing system according to claim 1,
wherein the printer having the printing job registered in the volatile memory erases a registered printing job from the volatile memory when an available space of the volatile memory is below a threshold value.

5. The printing system according to claim 1,
wherein the printer having the printing job registered in the non-volatile memory does not erase a registered printing job from the non-volatile memory even when an available space of the non-volatile memory is below a threshold value.

6. The printing system according to claim 1,
wherein the determination unit allows a user to select at least one printer in which the printing job will be registered in the volatile memory or at least one printer in which the printing job will be registered in the non-volatile memory.

7. The printing system according to claim 1,
wherein the determination unit determines, as the printer in which the printing job will be registered in the non-volatile memory, a printer having a higher using frequency in priority to a printer having a lower using frequency.

8. The printing system according to claim 1,
wherein the determination unit determines, as the printer in which the printing job will be registered in a non-volatile memory, a printer having a non-volatile memory with a larger available space in priority to a printer having a non-volatile memory with a smaller available space.

9. An information processing apparatus comprising:
a processor; and
a memory storing computer readable instructions that, when executed by the processor, cause the information processing apparatus to:
register a printing job based on a same printing target in a plurality of printers; and
determine, when registering the printing job in each of the plurality of printers, a registration destination of the printing job for each of the plurality of printers such that both a printer having the printing job registered in a volatile memory and a printer having the printing job registered in a non-volatile memory exist.

10. A printing system comprising:
a plurality of printers, one of which performing printing in response to a print instruction of a printing job thereto, and
an information processing apparatus including,
- a determination unit that determines a registration destination of a printing job based on a same printing target for each of the plurality of printers such that both a printer having the printing job registered in a volatile memory and a printer having the printing job registered in a non-volatile memory exist, and
- a registration unit that registers the printing job in each of the plurality of printers based on the determination by the determination unit.

11. The printing system according to claim 10,
wherein the information processing apparatus further includes,
- a first receiving unit that receives information relating to the printing job,
- a sending unit that sends a notification to each of the plurality of printers based on the information received by the first receiving unit, and
- a second receiving unit that receives a response to the notification sent by the sending unit from each of the plurality of printers, and
wherein the determination unit determines the registration destination of the printing job for each of the plurality of printers based on the response received by the second receiving unit.

12. The printing system according to claim 11,
wherein the information relating to the printing job indicates whether the printing job is a secure job.

13. The printing system according to claim 12,
wherein, when the information received by the first receiving unit indicates that the printing job is a secure job, the sending unit sends the notification, and when the information received by the first receiving unit indicates that the printing job is not a secure job, the sending unit does not send the notification.

14. The printing system according to claim 11,
wherein the second receiving unit receives a first response or a second response as the response from each of the plurality of printers, and
wherein the determination unit determines whether at least one first response has been received from the plurality of printers.

15. The printing system according to claim 14,
wherein, when the determination unit determines that at least one first response has been received, the printer in which the printing job will be registered in the non-volatile memory is determined from a printer from which the first response has been received.

* * * * *